United States Patent
Huang

(10) Patent No.: US 11,915,445 B2
(45) Date of Patent: Feb. 27, 2024

(54) SYSTEM AND METHOD FOR COUNTING AQUATIC CREATURES

(71) Applicant: NATIONAL SUN YAT-SEN UNIVERSITY, Kaohsiung (TW)

(72) Inventor: Ing-Jer Huang, Kaohsiung (TW)

(73) Assignee: NATIONAL SUN YAT-SEN UNIVERSITY, Kaohsiung (TW)

(*) Notice: Subject to any disclaimer, the term of this patent is extended or adjusted under 35 U.S.C. 154(b) by 570 days.

(21) Appl. No.: 17/138,930

(22) Filed: Dec. 31, 2020

(65) Prior Publication Data

US 2022/0207320 A1 Jun. 30, 2022

(51) Int. Cl.
| | | |
|---|---|---|
| G06T 7/70 | (2017.01) | |
| G06M 11/00 | (2006.01) | |
| A01K 11/00 | (2006.01) | |
| A01K 29/00 | (2006.01) | |

(52) U.S. Cl.
CPC .............. *G06T 7/70* (2017.01); *A01K 11/006* (2013.01); *A01K 29/00* (2013.01); *G06M 11/00* (2013.01); *G06T 2207/30188* (2013.01)

(58) Field of Classification Search
CPC ........ A01K 11/006; A01K 29/00; G06T 7/70; G06T 2207/30242; G06T 2207/30188; G06M 11/00
See application file for complete search history.

(56) References Cited

FOREIGN PATENT DOCUMENTS

| CN | 106447672 A | * | 2/2017 | | |
| CN | 107996528 A | | 5/2018 | | |
| CN | 110766123 A | * | 2/2020 | ............ | G06M 1/272 |
| CN | 110826592 A | | 2/2020 | | |
| CN | 111418537 A | | 7/2020 | | |
| CN | 111862246 A | | 10/2020 | | |

OTHER PUBLICATIONS

Zheng, Xitao, and Yongwei Zhang. "A fish population counting method using fuzzy artificial neural network." 2010 IEEE International Conference on Progress in Informatics and Computing. vol. 1. IEEE, 2010. (Year: 2010).*

* cited by examiner

*Primary Examiner* — Vu Le
*Assistant Examiner* — Tracy Mangialaschi
(74) *Attorney, Agent, or Firm* — CKC & Partners Co., LLC

(57) ABSTRACT

A system and a method for counting aquatic creatures are provided. The system includes an image capture device and a computer system configured to perform the method. The method includes: using the image capture device to capture images of a flow channel; defining a scan line in the images; performing a binarization process on pixels of the scan line in each of the images; determining aquatic creature range data according to each of the binarized pixel data sets; determining aquatic creature range data sets according to the binarized pixel data sets; determining identification and direction information of aquatic creature corresponding to each of the aquatic creature range data sets according to the aquatic creature range data sets; and determining a number of aquatic creatures passing through the scan line according to the identification and direction information of aquatic creature corresponding to each of the aquatic creature range data sets.

12 Claims, 10 Drawing Sheets

| time point | fry range (start position, end position) |
|---|---|
| 1 | (3,4), (13,14), (17,17) |
| 2 | (2,3), (12,15), (17,19) |
| 3 | (3,3), (5,6), (19,20) |
| 4 | (5,7) |
| 5 | (7,9) |
| 6 | (8,9), (16,16) |
| 7 | (3,6), (8,9), (16,17) |
| 8 | (3,5), (7,8), (16,16) |
| 9 | (1,3), (6,7) |
| 10 | N/A |

FIG. 5

| time point | identification and direction information of fry |
|---|---|
| 1 | <#1,(3,4),N>, <#2,(13,14),N>, <#3,(17,17),N> |

| fry | direction |
|---|---|
| #1 | N |
| #2 | N |
| #3 | N |

FIG. 6a

| time point | identification and direction information of fry |
|---|---|
| 1 | <#1,(3,4),N>, <#2,(13,14),N>, <#3,(17,17),N> |
| 2 | <#1,(2,3),L>, <#2,(12,15),V>, <#3,(17,19),R> |

| fry | direction |
|---|---|
| #1 | N,L |
| #2 | N,V |
| #3 | N,R |

FIG. 6b

| time point | identification and direction information of fry |
|---|---|
| 1 | <#1,(3,4),N>, <#2,(13,14),N>, <#3,(17,17),N> |
| 2 | <#1,(2,3),L>, <#2,(12,15),V>, <#3,(17,19),R> |
| 3 | <#1,(3,3),V>, <#4,(5,6),N>, <#3,(19,20),R> |

| fry | direction |
|---|---|
| #1 | N,L,V |
| #2 | N,V |
| #3 | N,R |
| #4 | N |

FIG. 6c

| time point | identification and direction information of fry |
|---|---|
| 1 | <#1,(3,4),N>, <#2,(13,14),N>, <#3,(17,17),N> |
| 2 | <#1,(2,3),L>, <#2,(12,15),V>, <#3,(17,19),R> |
| 3 | <#1,(3,3),V>, <#4,(5,6),N>, <#3,(19,20),R> |
| 4 | <#4,(5,7),R> |
| 5 | <#4,(7,9),R> |
| 6 | <#4,(8,9),V>, <#5,(16,16),N> |
| 7 | <#6,(3,6),N>, <#4,(8,9),V>, <#5,(16,17),V> |

| fry | direction |
|---|---|
| #1 | N,L,V |
| #2 | N,V |
| #3 | N,R |
| #4 | N,R,V |
| #5 | N,V |
| #6 | N |

FIG. 6d

| time point | identification and direction information of fry |
|---|---|
| 1 | <#1,(3,4),N>, <#2,(13,14),N>, <#3,(17,17),N> |
| 2 | <#1,(2,3),L>, <#2,(12,15),V>, <#3,(17,19),R> |
| 3 | <#1,(3,3),V>, <#4,(5,6),N>, <#3,(19,20),R> |
| 4 | <#4,(5,7),R> |
| 5 | <#4,(7,9),R> |
| 6 | <#4,(8,9),V>, <#5,(16,16),N> |
| 7 | <#6,(3,6),N>, <#4,(8,9),V>, <#5,(16,17),V> |
| 8 | <#6,(3,5),V>, <#7,(7,8),N>, <#5,(16,16),V> |

| fry | direction |
|---|---|
| #1 | N,L,V |
| #2 | N,V |
| #3 | N,R |
| #4 | N,R,V |
| #5 | N,V |
| #6 | N |
| #7 | N |

FIG. 6e

| time point | identification and direction information of fry |
|---|---|
| 1 | <#1,(3,4),N>, <#2,(13,14),N>, <#3,(17,17),N> |
| 2 | <#1,(2,3),L>, <#2,(12,15),V>, <#3,(17,19),R> |
| 3 | <#1,(3,3),V>, <#4,(5,6),N>, <#3,(19,20),R> |
| 4 | <#4,(5,7),R> |
| 5 | <#4,(7,9),R> |
| 6 | <#4,(8,9),V>, <#5,(16,16),N> |
| 7 | <#6,(3,6),N>, <#4,(8,9),V>, <#5,(16,17),V> |
| 8 | <#6,(3,5),V>, <#7,(7,8),N>, <#5,(16,16),V> |
| 9 | <#6,(1,3),L>, <#7,(6,7),L> |
| 10 | N/A |

| fry | direction |
|---|---|
| #1 | N,L,V |
| #2 | N,V |
| #3 | N,R |
| #4 | N,R,V |
| #5 | N,V |
| #6 | N,V,L |
| #7 | N,L |

FIG. 6f

| time point | fry range (start position, end position) |
|---|---|
| 1 | (7, 9), (13, 15) |
| 2 | (8, 14) |
| 3 | (7, 9), (13, 15) |
| 4 | N/A |

| time point | identification and direction information of fry |
|---|---|
| 1 | <#1,(7,9),N>,<#2,(13,15),N> |

| fry | direction |
|---|---|
| #1 | N |
| #2 | N |

FIG. 11a

| time point | identification and direction information of fry |
|---|---|
| 1 | <#1,(7,9),N>,<#2,(13,15),N> |
| 2 | <#1,(8,14),R> |

| fry | direction |
|---|---|
| #1 | N, R |
| #2 | N |

FIG. 11b

| time point | identification and direction information of fry |
|---|---|
| 1 | <#1,(8,9),N>,<#2,(13,14),N> |
| 2 | <#1,(8,14),R>,<#2,(8,14),L> |
| 3 | <#1,(13,15),R>,<#2,(7,9),L> |
| 4 | N/A |

| fry | direction |
|---|---|
| #1 | N, R |
| #2 | N, L |

FIG. 11c

SYSTEM AND METHOD FOR COUNTING AQUATIC CREATURES

BACKGROUND

Field of Invention

The present disclosure relates to a system and a method for counting aquatic creatures.

Description of Related Art

In the field of aquaculture, management operations for aquatic creatures such as aquatic creatures counting are required for convenience of breeding the aquatic creatures. Typically, aquatic creature counting is often performed by human calculation. For example, in a case of counting fries, a fry counting worker counts the fries one by one to obtain the number of the fries. However, the human calculation for counting fries heavily relies upon the fry counting worker's experience. Therefore, various systems for counting aquatic creatures are developed to help the fry counting worker to calculate the number of the aquatic creatures.

SUMMARY

Embodiments of the present disclosure provide a system and a method for counting aquatic creatures to obtain the number of the aquatic creatures by analyzing images of a flow channel.

In accordance with an embodiment of the present invention, the method for counting aquatic creatures includes: providing a plurality of flow channel images of a flow channel, in which the flow channel images correspond to a plurality of image capturing time points in a one-to-one manner; defining a scan line in each of the flow channel images, in which the scan line corresponds to a plurality of scan line pixels in each of the flow channel images; performing a binarization process on the scan line pixels in each of the flow channel images to obtain a plurality of binarized pixel data sets, in which the binarized pixel data sets correspond to the flow channel images in a one-to-one manner; determining a plurality of aquatic creature range data sets in accordance with the binarized pixel data sets, in which the aquatic creature range data sets correspond to the flow channel images in a one-to-one manner, and each of the aquatic creature range data sets comprises at least one aquatic creature position data set, and the aquatic creature position data set includes a start position of aquatic creature and an end position of aquatic creature; determining identification and direction information of aquatic creature corresponding to each of the aquatic creature range data sets in accordance with the aquatic creature range data sets; and determining a number of aquatic creatures passing through the scan line in accordance with the identification and direction information of aquatic creature corresponding to each of the aquatic creature range data sets.

In some embodiments, determining the identification and direction information of aquatic creature corresponding to each of the aquatic creature range data sets in accordance with the aquatic creature range data sets includes: determining a first identification code of aquatic creature and a corresponding first direction code of aquatic creature in accordance with a first aquatic creature range data set, in which the first aquatic creature range data set is one of the aquatic creature range data sets; and determining a second identification code of aquatic creature and a corresponding second direction code of aquatic creature in accordance with a second aquatic creature range data set, the first identification code of aquatic creature and the first direction code of aquatic creature, in which the second aquatic creature range data set is one of the aquatic creature range data sets corresponding to a time point later than a time point to which the first aquatic creature range data corresponds.

In some embodiments, determining the second identification code of aquatic creature and the corresponding second direction code of aquatic creature in accordance with the second aquatic creature range data set, the first identification code of aquatic creature and the first direction code of aquatic creature includes: determining whether the aquatic creature position data set of the second aquatic creature range data set overlaps or adjoins the aquatic creature position data set of the first aquatic creature range data set; when the aquatic creature position data set of the second aquatic creature range data set overlaps or adjoins the aquatic creature position data set of the first aquatic creature range data set, a value of the second identification code is set to be the same as the value of the first identification code.

In some embodiments, determining the identification and direction information of aquatic creature corresponding to each of the aquatic creature range data sets in accordance with the aquatic creature range data sets further includes: determining a third identification code of aquatic creature and a corresponding third direction code of aquatic creature in accordance with a third aquatic creature range data set, the second identification code of aquatic creature and the second direction code of aquatic creature, in which the third aquatic creature range data set is one of the aquatic creature range data sets corresponding to a time point later than a time point to which the second aquatic creature range data corresponds; in which when the aquatic creature position data set of the third aquatic creature range data set overlaps or adjoins the aquatic creature position data set of the second aquatic creature range data set, a value of the third identification code is set to be the same as the value of the second identification code.

In some embodiments, determining the identification and direction information of aquatic creature corresponding to each of the aquatic creature range data sets in accordance with the aquatic creature range data sets further includes: performing a check step to determining whether the direction represented by the third direction code of aquatic creature is opposite to the direction represented by the second direction code of aquatic creature; when the direction represented by the third direction code of aquatic creature is opposite to the direction represented by the second direction code of aquatic creature, the value of the third identification code is set to be a new value different from the value of the second identification code.

In some embodiments, determining the identification and direction information of aquatic creature corresponding to each of the aquatic creature range data sets in accordance with the aquatic creature range data sets includes: determining whether the aquatic creature position data sets of a first aquatic creature range data set overlaps the aquatic creature position data set of a second aquatic creature range data set to provide a first determination result, in which the first aquatic creature range data set is one of the aquatic creature range data sets, the second aquatic creature range data set is another one of the aquatic creature range data sets corresponding to a time point later than a time point to which the first aquatic creature range data corresponds; determining whether the aquatic creature position data sets of a third aquatic creature range data set overlaps the aquatic creature position data set of the second aquatic creature range data set to provide a second determination result, in which the third aquatic creature range data set is further another one of the aquatic creature range data sets corresponding to a time point later than the time point to which the second aquatic creature range data corresponds; and when the first determination result and the second determination result are yes, it is determined that the aquatic creatures overlaps each other at the image capturing time point of the second aquatic creature range data set, and the identification and direction information of aquatic creature is determined accordingly.

In accordance with an embodiment of the present invention, the system for counting aquatic creatures includes: an image capturing device and a computer system. The image capturing device is configured to capture a plurality of flow channel images of a flow channel, in which the flow channel images correspond to a plurality of image capturing time points in a one-to-one manner. The computer system is electrically connected to the image capturing device to receive the flow channel images, in which the computer system includes: a memory and a processor. The memory is configured to store a plurality of instructions. The processor is configured to execute the instructions to: define a scan line in each of the flow channel images, in which the scan line corresponds to a plurality of scan line pixels in each of the flow channel images; perform a binarization process on the scan line pixels in each of the flow channel images to obtain a plurality of binarized pixel data sets, in which the binarized pixel data sets correspond to the flow channel images in a one-to-one manner; determine a plurality of aquatic creature range data sets in accordance with the binarized pixel data sets, in which the aquatic creature range data sets correspond to the flow channel images in a one-to-one manner, and each of the aquatic creature range data sets comprises at least one aquatic creature position data set, and the aquatic creature position data set includes a start position of aquatic creature and an end position of aquatic creature; determine identification and direction information of aquatic creature corresponding to each of the aquatic creature range data sets in accordance with the aquatic creature range data sets; and determine a number of aquatic creatures passing through the scan line in accordance with the identification and direction information of aquatic creature corresponding to each of the aquatic creature range data sets.

In some embodiments, when the processor determines the identification and direction information of aquatic creature corresponding to each of the aquatic creature range data sets in accordance with the aquatic creature range data sets, the processor is configured to: determine a first identification code of aquatic creature and a corresponding first direction code of aquatic creature in accordance with a first aquatic creature range data set, in which the first aquatic creature range data set is one of the aquatic creature range data sets; and determine a second identification code of aquatic creature and a corresponding second direction code of aquatic creature in accordance with a second aquatic creature range data set, the first identification code of aquatic creature and the first direction code of aquatic creature, in which the second aquatic creature range data set is one of the aquatic creature range data sets corresponding to a time point later than a time point to which the first aquatic creature range data corresponds.

In some embodiments, when the processor determine the second identification code of aquatic creature and the corresponding second direction code of aquatic creature in accordance with the second aquatic creature range data set, the first identification code of aquatic creature and the first direction code of aquatic creature, the processor is configured to: determine whether the aquatic creature position data set of the second aquatic creature range data set overlaps or adjoins the aquatic creature position data set of the first aquatic creature range data set; when the aquatic creature position data set of the second aquatic creature range data set overlaps or adjoins the aquatic creature position data set of the first aquatic creature range data set, a value of the second identification code is set to be the same as the value of the first identification code.

In some embodiments, when the processor determines the identification and direction information of aquatic creature corresponding to each of the aquatic creature range data sets in accordance with the aquatic creature range data sets, the processor is configured to: determine a third identification code of aquatic creature and a corresponding third direction code of aquatic creature in accordance with a third aquatic creature range data set, the second identification code of aquatic creature and the second direction code of aquatic creature, in which the third aquatic creature range data set is one of the aquatic creature range data sets corresponding to a time point later than a time point to which the second aquatic creature range data corresponds; in which when the aquatic creature position data set of the third aquatic creature range data set overlaps or adjoins the aquatic creature position data set of the second aquatic creature range data set, a value of the third identification code is set to be the same as the value of the second identification code.

In some embodiments, when the processor determines the identification and direction information of aquatic creature corresponding to each of the aquatic creature range data sets in accordance with the aquatic creature range data sets, the processor is configured to: perform a check step to determining whether the direction represented by the third direction code of aquatic creature is opposite to the direction represented by the second direction code of aquatic creature; when the direction represented by the third direction code of aquatic creature is opposite to the direction represented by the second direction code of aquatic creature, the value of the third identification code is set to be a new value different from the value of the second identification code.

In some embodiments, when the processor determines the identification and direction information of aquatic creature corresponding to each of the aquatic creature range data sets in accordance with the aquatic creature range data sets, the processor is configured to: determine whether the aquatic creature position data sets of a first aquatic creature range data set overlaps the aquatic creature position data set of a second aquatic creature range data set to provide a first determination result, in which the first aquatic creature range data set is one of the aquatic creature range data sets, the second aquatic creature range data set is another one of the aquatic creature range data sets corresponding to a time point later than a time point to which the first aquatic creature range data corresponds; determine whether the aquatic creature position data sets of a third aquatic creature range data set overlaps the aquatic creature position data set of the second aquatic creature range data set to provide a second determination result, in which the third aquatic creature range data set is further another one of the aquatic creature range data sets corresponding to a time point later than the time point to which the second aquatic creature range data corresponds; and when the first determination result and the second determination result are yes, it is determined that the aquatic creatures overlaps each other at the image capturing time point of the second aquatic creature range data set, and the identification and direction information of aquatic creature is determined accordingly.

BRIEF DESCRIPTION OF THE DRAWINGS

The invention can be more fully understood by reading the following detailed description of the embodiment, with reference made to the accompanying drawings as follows.

FIG. 4 is a schematic diagram showing binarized pixel data sets in accordance with an embodiment of the present invention.

FIG. 5 is a schematic diagram showing the aquatic creature range data sets in accordance with an embodiment of the present invention.

FIGS. 6a-6f are schematic diagrams showing identification and direction information of aquatic creature in accordance with an embodiment of the present invention.

FIGS. 11a-11c are schematic diagrams showing identification and direction information of aquatic creature in accordance with an embodiment of the present invention.

DETAILED DESCRIPTION

Figure 1:
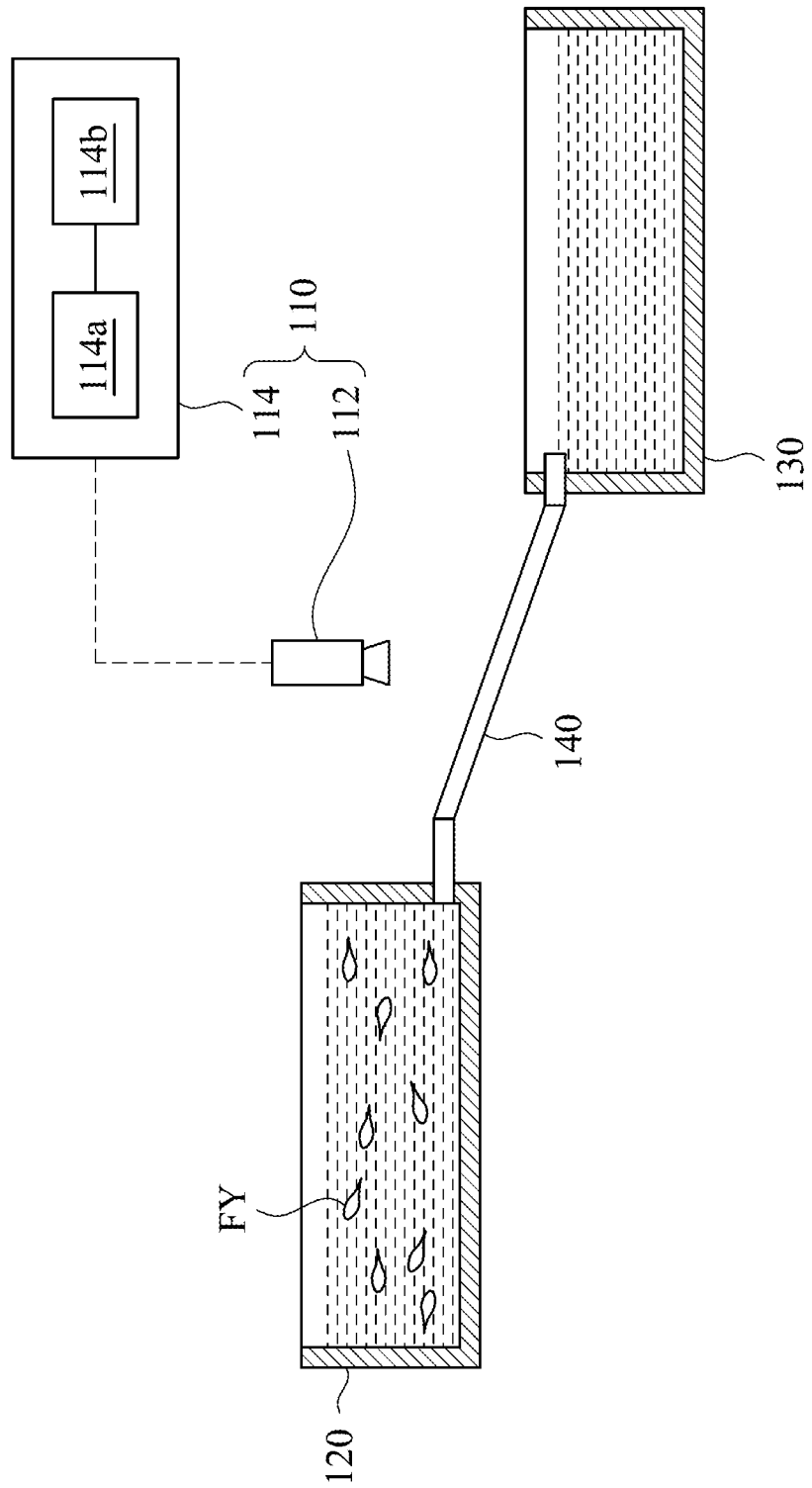
FIG. 1 is a schematic diagram showing a system for counting aquatic creatures in accordance with an embodiment of the present invention.

Referring to FIG. 1, FIG. 1 is a schematic diagram showing a system 110 for counting aquatic creatures in accordance with an embodiment of the present invention. In the embodiments of the present invention, the counting system 110 is configured to calculate a number of the fries FY in a water sink 120, but embodiments of the present invention are not limited thereto. In other embodiments of the present invention, the counting system 110 can be applied to calculate a number of other aquatic creatures such as shrimps. As shown in FIG. a flow channel 140 is disposed between the water sink 120 and a water sink 130 to allow the fries FY in the water sink 120 to be moved from the water sink 120 to the water sink 130. In the embodiments of the present invention, the design of the flow channel 140 enables the fries FY to be moved from the water sink 120 to the water sink 130 in one way. In other words, the fries FY cannot move back to the water sink 120 when they are in the flow channel 140.

The counting system 110 includes an image capturing device 112 and a computer system 114. The image capturing device 112 is disposed adjacent to the flow channel 140 to capture an image of the flow channel 140. For example, the image capturing device 112 can be disposed on various positions such as the top, bottom, left side or right side of the flow channel 140. The image capturing device 112 can be a camera, a Complementary Metal-Oxide-Semiconductor image sensor (CIS), or a charge-coupled device (CCD) image sensor. The computer system 114 is electrically connected to the image capturing device 112 through, for example, a wire/wireless method, so as to receive and analyze the flow channel image captured by the image capturing device 112. In the embodiments of the present invention, the computer system 114 includes a memory 114a and a processor 114b. The memory 114a stores a plurality of instructions, and the processor 114b is configured to execute the instructions in the memory 114a to analyze the flow channel image.

Figure 2:
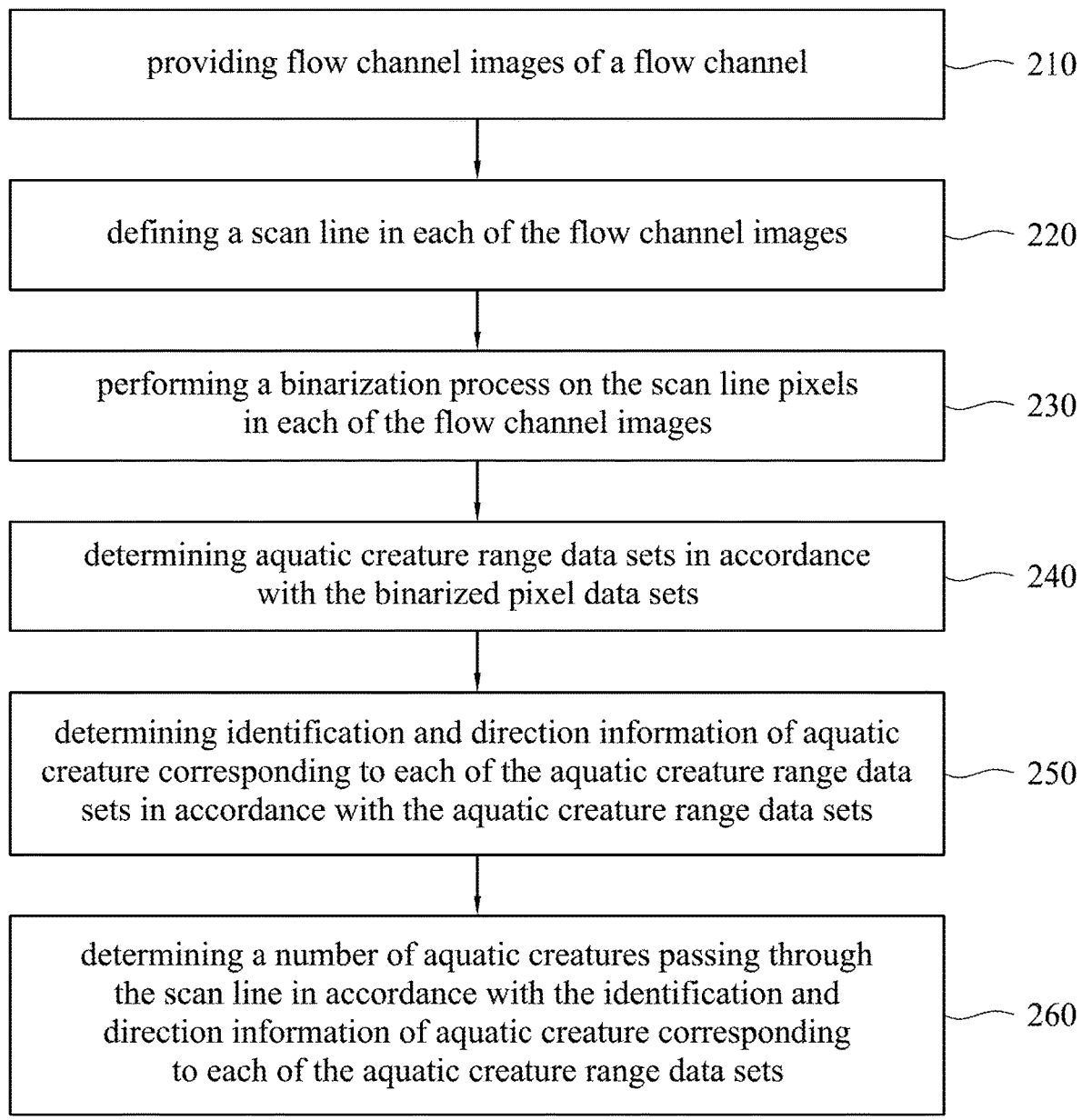
FIG. 2 is a flow chart showing a method for counting aquatic creatures in accordance with an embodiment of the present invention.
Figure 3A:
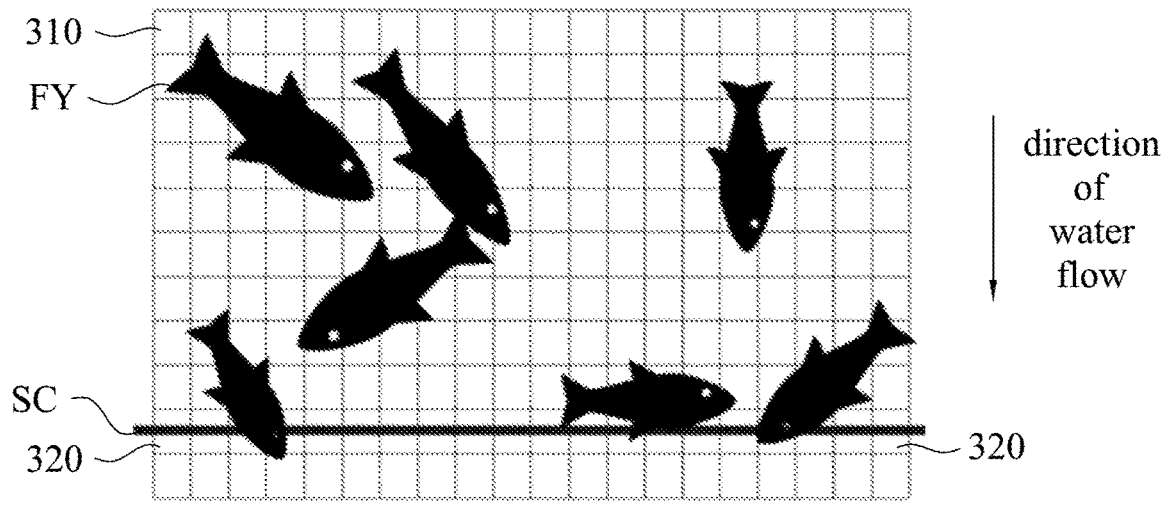
FIG. 3a and FIG. 3b are schematic diagrams showing flow channel images in accordance with an embodiment of the present invention.
Figure 3B:
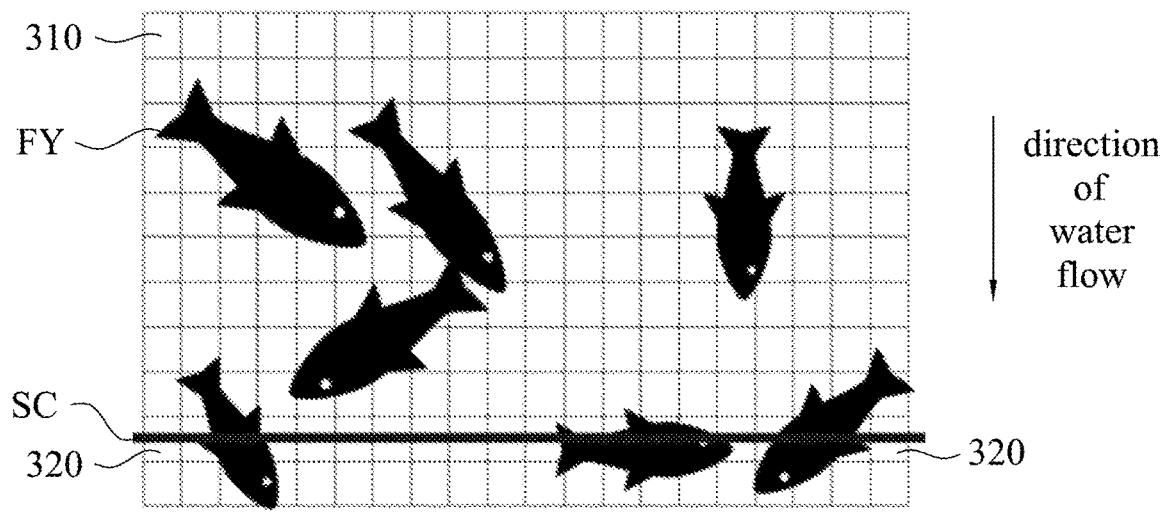

Referring to FIG. 2, FIG. 2 is a flow chart showing a method 200 for counting aquatic creatures in accordance with an embodiment of the present invention, in which the counting method 200 is applied to the counting system 110. In the counting method 200, at first, step 210 is performed to use the image capturing device 112 to provide plural flow channel images of the flow channel 140. In an embodiment of the present invention, the image capturing device 112 captures the flow channel images of the flow channel 140 at a frequency of once every 0.1 second, but embodiments of the present invention are not limited thereto. In other embodiments of the present invention, the frequency used to capture the flow channel images can be adjusted in accordance with the type of the aquatic creatures and the structure of the flow channel 140. Thereafter, step 220 is performed to define a scan line in each of the flow channel images, thereby using the scan line to calculate a number of the fries FY. Referring to FIG. 3a and FIG. 3b, FIG. 3a and FIG. 3b are schematic diagrams showing a flow channel image 300a and a flow channel image 300b in accordance with an embodiment of the present invention, in which the flow channel image 300a and a flow channel image 300b correspond to continuous time points. In an embodiment of the present invention, the scan line SC in each of the flow channel images is defined at the same positions. For example, in the flow channel image 300a, the scan line SC is defined at the lower portion of the flow channel image 300a, and the scan line SC in the flow channel image 300b is defined at the position. Further, the scan line is a visual line for the flow channel images, and thus the scan line does not affect the content of the flow channel images. For example, the scan lines SC does not change the value of the pixels of the flow channel images 300a and 330b.

Then, step 230 is performed to perform a binarization process on pixels of the scan line in each of the flow channel images to obtain plural binarized pixel data sets. As shown in FIG. 3a and FIG. 3b, after the scan lines SC are defined, the pixels 320 through which the scan lines SC pass are obtained. Step 230 performs the binarization process on the scan line pixels 320 of each of the flow channel images to obtain the binarized pixel data sets of each of the flow channel images. Referring to FIG. 4, FIG. 4 is a schematic diagram showing the binarized pixel data sets in accordance with an embodiment of the present invention. In the embodiment of the present invention, a number of the scan line pixels 320 is 20, and thus each of the binarized pixel data sets consists of 20 pixels, in which a pixel corresponding to a fry is represented by a black block (for example, a value of the binarized pixel is "1"). For example, a binarized pixel data set of a flow channel image corresponding to a first image capturing time point (i.e., 0.1 s) includes five black blocks located at the $4^{th}$-$5^{th}$ pixels, the $13^{th}$-$14^{th}$ pixels and the $17^{th}$ pixel. For another example, a binarized pixel data set of a flow channel image corresponding to a second image capturing time point (i.e., 0.2 s) includes nine black blocks located at the $2^{nd}$-$3^{rd}$ pixels, the $12^{th}$-$15^{th}$ pixels and the $17^{th}$-$19^{th}$ pixels. For further another example, a binarized pixel data set of a flow channel image corresponding to a third image capturing time point (i.e., 0.3 s) includes five black blocks located at the $3^{rd}$ pixel, $5^{th}$-$6^{th}$ pixels and $19^{th}$-$20^{th}$ pixels. Because there are ten continuous flow channel images in this embodiment, ten binarized pixel data set are obtained accordingly, in which a binarized pixel data set of a flow channel image corresponding to a tenth image capturing time point (i.e., 1 s) does not include any black block. In other words, there is no fish on the scan line SC at the tenth image capturing time point.

Thereafter, step 240 is performed to determine plural aquatic creature range data sets in accordance with the binarized pixel data sets. Referring to FIG. 5, FIG. 5 is schematic diagram showing the aquatic creature range data sets in accordance with an embodiment of the present invention. Each of the aquatic creature range data sets is determined in accordance with the black blocks of the binarized pixel data set. For example, the binarized pixel data set of the flow channel image corresponding to the first image capturing time point (i.e., 0.1 s) includes the black blocks located at the $4^{th}$-$5^{th}$ pixels, the $13^{th}$-$14^{th}$ pixels and the $17^{th}$ pixel, and thus the aquatic creature range data set corresponding to the first image capturing time point includes three aquatic creature position data sets (3,4), (13,14) and (17,17), in which 3, 13, 17 represent start positions of aquatic creature and 4, 14, 17 represent end positions of aquatic creature. For another example, the binarized pixel data set of the flow channel image corresponding to the second image capturing time point includes the black blocks located at the $2^{nd}$-$3^{rd}$ pixels, the $12^{th}$-$15^{th}$ pixels and the $17^{th}$-$19^{th}$ pixels, and thus the aquatic creature range data set corresponding to the second image capturing time point includes three aquatic creature position data sets (2,3), (12,15) and (17,19). For further another example, the binarized pixel data set of the flow channel image corresponding to the third image capturing time point includes the black blocks located at the $3^{rd}$ pixel, $5^{th}$-$6^{th}$ pixels and $19^{th}$-$20^{th}$ pixels, and thus the aquatic creature range data set corresponding to the third image capturing time point includes three aquatic creature position data sets (3,3), (5,6) and (19,20).

In addition, because the binarized pixel data set of the flow channel image corresponding to the tenth image capturing time point does not include any black blocks, the aquatic creature range data set corresponding to the third image capturing time point is represented by N/A.

Then, step 250 is performed to determine identification and direction information of aquatic creature corresponding to each of the aquatic creature range data sets in accordance with the aquatic creature range data sets. Referring to FIGS. 6a-6f, FIGS. 6a-6f are schematic diagrams showing identification and direction information of aquatic creature in accordance with an embodiment of the present invention. As shown in FIG. 6a, because the first image capturing time point is an initial time point, and the aquatic creature range data set corresponding to the first image capturing time point includes three aquatic creature position data sets (3,4), (13,14) and (17,17), three identification codes of aquatic creature (for example, fry) #1, #2 and #3 are given to the three aquatic creature position data sets, and a direction code of aquatic creature N is given to represent an uncertain direction. Therefore, the identification and direction information of aquatic creature corresponding to the aquatic creature range data set of the first image capturing time point is <#1,(3,4),N>, <#2,(13, 14),N>, <#3,(17,17),N>.

The embodiments of the present invention may determine whether the aquatic creature position data sets of adjacent image capturing time points (for example, the first image capturing time point and the second image capturing time point) overlap or adjoins each other to provide proper, so as to give proper identification codes. As shown in FIG. 6B, the second image capturing time point follows the first image capturing time point, and the corresponding aquatic creature range data set includes three aquatic creature position data sets (2,3), (12,15) and (17,19), in which the aquatic creature position data set (2,3) overlaps the above <#1,(3,4),N>, and the position of aquatic creature is expanded to a direction of left pixel. Therefore, the aquatic creature position data set (2,3) can succeed the identification code of aquatic creature #1, and a direction code of aquatic creature L is given to represent that the aquatic creature #1 moves toward left side.

Further, the aquatic creature position data set (12,15) overlaps the above <#2,(13,14),N>, and the aquatic creature position does not represent a significant trend toward right side or left side. Therefore, the aquatic creature position data set (12,15) can succeed the identification code of aquatic creature #2, and a direction code of aquatic creature V is given to represent that the aquatic creature #2 moves ahead.

Furthermore, the aquatic creature position data set (17,19) overlaps the above <#3,(17,17),N>, and the aquatic creature position is expanded to a direction of right pixel. Therefore, the aquatic creature position data set (17,19) can succeed the identification code of aquatic creature #3, and a direction identification code of aquatic creature (which may be referred to as "direction code") R is given to represent that the aquatic creature #2 moves toward right side.

Therefore, the identification and direction information of aquatic creature corresponding to the aquatic creature range data set of the second image capturing time point is <#1, (2,3),L>, <#2,(12,15),V>, <#3,(17,19),R>.

In addition, in an embodiment of the present invention, the direction of aquatic creature can be determined in accordance with the increase or decrease of the values of the aquatic creature position data sets. For example, regarding the aquatic creature position data set (2,3) and the aquatic creature position data set (3,4) corresponding to the previous time point, the variation of the value of the aquatic creature position data set is (−1,−1), and a sum of the variation is −2 which represents that the value of the aquatic creature position data set is decreased. Therefore, it is determined that the aquatic creature moves toward left side. For another example, regarding the aquatic creature position data set (17,19) and the aquatic creature position data set (17,19) corresponding to the previous time point, the variation of the value of the aquatic creature position data set is (0,+2), and a sum of the variation is +2. Therefore, it is determined that the aquatic creature moves toward right side.

Further another example, regarding the aquatic creature position data set (12,15) and the aquatic creature position data set (13,14) corresponding to the previous time point, the variation of the value of the aquatic creature position data set is (+1,−1), and a sum of the variation is 0. Therefore, it is determined that the aquatic creature does not have a significant trend toward right side or left side.

As shown in FIG. 6c, the third image capturing time point follows the second image capturing time point, and the corresponding aquatic creature range data set includes three aquatic creature position data sets (3,3), (5,6) and (19,20), in which the aquatic creature position data set (3,3) overlaps the above <#1,(2,3),N>, and the position of aquatic creature does not represent a significant trend toward right side or left side. Therefore, the aquatic creature position data set (3,3) can succeed the identification code of aquatic creature #1, and a direction code of aquatic creature V is given to represent that the aquatic creature #1 moves ahead.

Further, the aquatic creature position data set (5,6) does not overlaps or adjoins any aquatic creature position data set of the second image capturing time point. Therefore, a new identification code of aquatic creature #4 is given to the aquatic creature position data set (5,6), and the direction code of aquatic creature N is given accordingly.

Furthermore, the aquatic creature position data set (19,20) overlaps the above <#3,(17,19),R>, and the aquatic creature position is expanded to a direction of right pixel. Therefore, the aquatic creature position data set (19,20) can succeed the identification code of aquatic creature #3, and a direction code of aquatic creature R is given to represent that the aquatic creature #3 moves toward right side.

Therefore. the identification and direction information of aquatic creature corresponding to the aquatic creature range data set of the third image capturing time point is <#1,(3,3),L>, <#4,(5,6),N>, <#3,(19,20),R>.

The aquatic creature range data sets of the fourth image capturing time point to the seventh image capturing time point to are subsequently analyzed, so as to obtain the identification and direction information of aquatic creature as shown in FIG. 6d. Thereafter, the aquatic creature range data set of the eighth image capturing time point is analyzed. The eighth image capturing time point follows the seventh image capturing time point, and the corresponding aquatic creature range data set includes three aquatic creature position data sets (3,5), (7,8) and (16,16), in which the aquatic creature position data set (7,8) overlaps the above <#4,(8,9),V>, and the aquatic creature position is expanded to a direction of left pixel. Therefore, the aquatic creature position data set (7,8) can succeed the identification code of aquatic creature #4, and a direction code of aquatic creature L is given to represent that the aquatic creature #3 moves toward left side. However, at the fourth image capturing time point and the fifth image capturing time point, the aquatic creature #4 moves toward right side. Because the aquatic creature cannot change its moving direction in a short time period, a check step is performed in this embodiment of the present invention, so as to check whether the identification codes of aquatic creature conflict with each other. For example, when one of the aquatic creature position data set is analyzed, the one of the aquatic creature position data set is checked to determine whether a identification code of aquatic creature obtained from the one of the aquatic creature position data set and a corresponding direction code conflicts with an identification code of aquatic creature and a corresponding direction code of a previous time point, and to properly fix the identification code of aquatic creature when they conflict with each other.

For example, in this embodiment, when the aquatic creature position data set (7,8) of the eighth image capturing time point is analyzed, an identification code of aquatic creature #4 and a corresponding direction code L are obtained. Thereafter, a check step is performed on the identification code of aquatic creature #4 and the direction code L to determine whether the identification code of aquatic creature #4 and the direction code L conflict with the identification and direction information of aquatic creature corresponding to previous time points. Because the aquatic creature represented by the identification code of aquatic creature #4 has an opposite direction code R, it is determined that a conflict happens. In this case, a new identification code of aquatic creature #7 is given to represent a new aquatic creature passes the scan line SC, and the original <#4,(7,8),L> is corrected to <#7,(7,8),N>, as shown in FIG. 6e.

The check step is continuously performed on the aquatic creature position data sets of other image capturing time points for analysis and check, the identification and direction information of aquatic creature corresponding to the image capturing time points can be obtained as shown in FIG. 6f. Then, step 260 is performed to determine a number of aquatic creatures passing through the scan line in accordance with the identification and direction information of aquatic creature corresponding to each of the aquatic creature range data sets. As shown in FIG. 6f, it can be understood that all of the aquatic creature range data sets correspond to seven identification codes of aquatic creature #1-#7. In other words, there are seven aquatic creatures passing though the scan line SC between the first image capturing time point and the tenth image capturing time point.

As state above, the method 200 for counting aquatic creatures performs a binarization process on pixels of the scan line to obtain the aquatic creature position data sets, an then the aquatic creature position data sets are analyzed to obtain the number of the aquatic creatures. In addition, the counting method 200 also provides a check step to check whether a case of direction conflict happens to improve the accuracy of the counting method.

Figure 7:
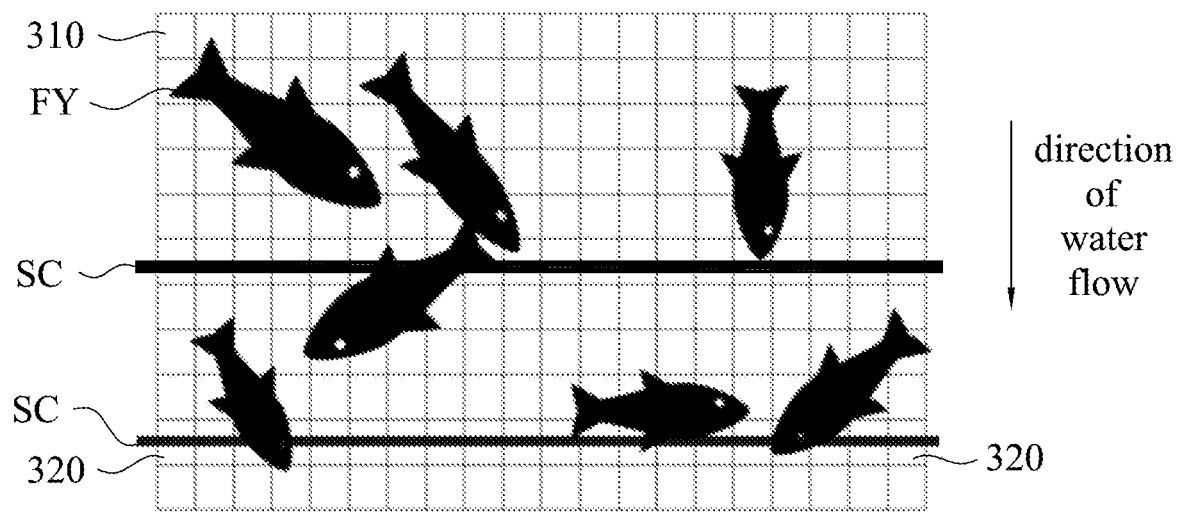
FIG. 7 is a schematic diagram showing a flow channel image in accordance with an embodiment of the present invention.

Referring to FIG. 7, FIG. 7 is a schematic diagram showing a flow channel image 700 in accordance with an embodiment of the present invention, in which plural scan lines SC are defined in the flow channel image 700. Because this embodiment can obtain scan aquatic creature range data sets from the plural scan lines SC, this embodiment can integrates the number determination results of the scan lines SC. For example, statics can be applied on the number determination results in this embodiment, so as to further improve the accuracy of the method for counting aquatic creatures. It is noted that, only the pixel data of the two scan lines SC are extracted in this embodiment. It is not required to extract all pixel data of the flow channel image 700.

Figure 8:
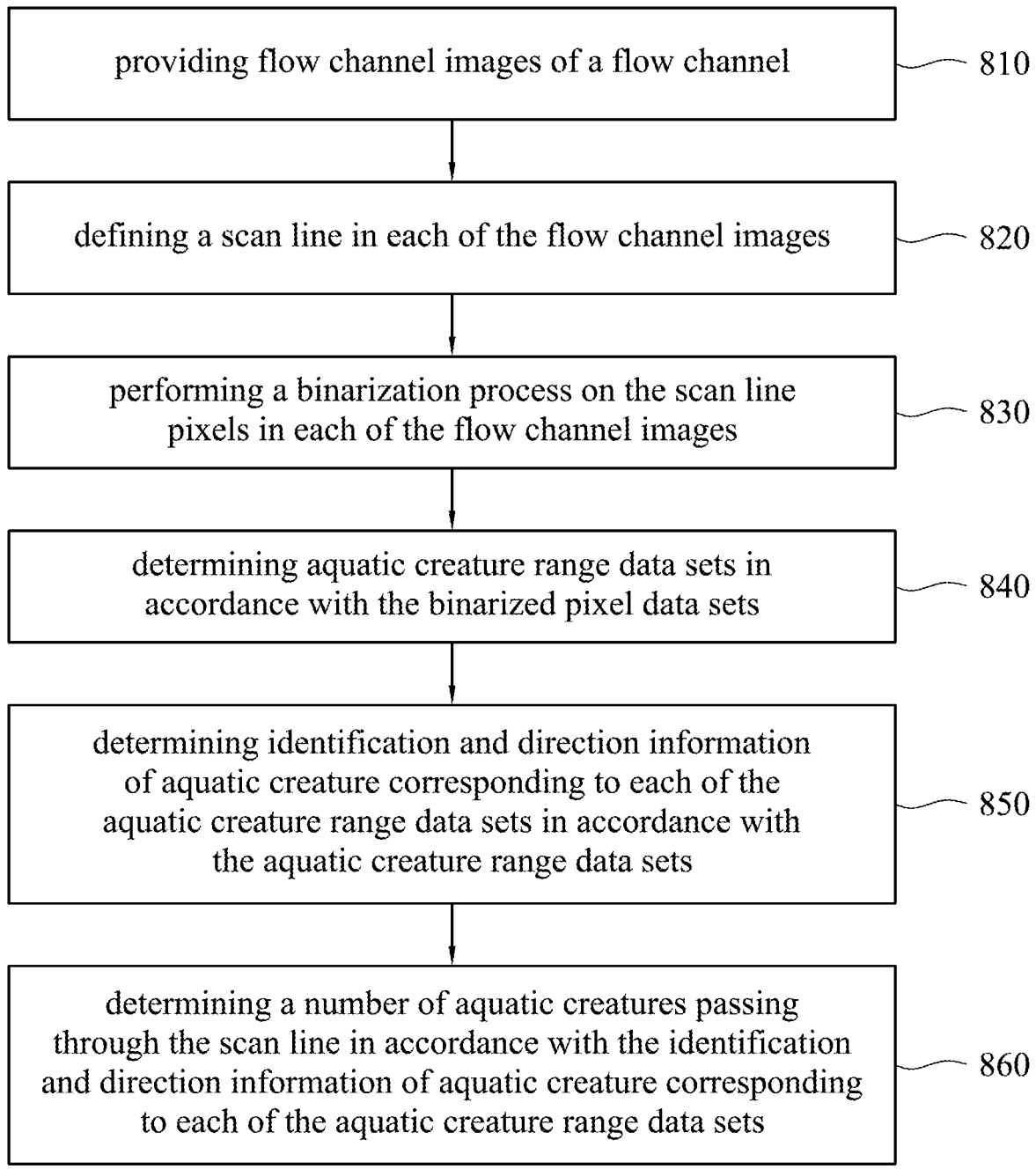
FIG. 8 is a flow chart showing a method for counting aquatic creatures in accordance with an embodiment of the present invention.

Referring to FIG. 8, FIG. 8 is a flow chart showing a method 800 for counting aquatic creatures in accordance with an embodiment of the present invention. In the counting method 800, at first, steps 810-830 are performed to use the image capturing device 112 to provide plural flow channel images of the flow channel 140, and to perform a binarization process on the flow channel images. Because the steps 810-830 are similar to the above steps 210-230, details thereof are not repeated herein. In this embodiment, the binarized pixel data sets obtained from step 830 are shown as FIG. 9.

Figures 9, 10:
FIG. 9 is a schematic diagram showing binarized pixel data sets in accordance with an embodiment of the present invention.
FIG. 10 is a schematic diagram showing the aquatic creature range data sets in accordance with an embodiment of the present invention.

FIG. 9 includes three binarized pixel data sets respectively corresponding to a first image capturing time point (i.e., 0.1 s), a second image capturing time point (i.e., 0.2 s) and a third image capturing time point (i.e., 0.3 s). The binarized pixel data set corresponding to the first image capturing time point includes six black blocks located at the $7^{th}$-$9^{th}$ pixels and the $13^{th}$-$15^{th}$ pixel. The binarized pixel data set corresponding to the second image capturing time includes seven black blocks located at the $8^{th}$-$14^{th}$ pixels. The binarized pixel data set corresponding to the third image capturing time point includes six black blocks located at the $7^{th}$-$9^{th}$ pixels and the $13^{th}$-$15^{th}$ pixel.

Thereafter, step 840 is performed to determine plural aquatic creature range data sets in accordance with the binarized pixel data sets. Referring to FIG. 10, FIG. 10 is a schematic diagram showing aquatic creature range data sets in accordance with an embodiment of the present invention.

Each of the aquatic creature range data sets is determined in accordance with the black blocks of the binarized pixel data sets. For example, the binarized pixel data set of the flow channel image corresponding to the first image capturing time point includes the black blocks located at the $7^{th}$-$9^{th}$ pixels and the $13^{th}$-$15^{th}$ pixel, and thus the aquatic creature range data set corresponding to the first image capturing time point includes two aquatic creature position data sets (7,9) and (13,15). For another example, the binarized pixel data set of the flow channel image corresponding to the second image capturing time point includes the black blocks located at the $8^{th}$-$14^{th}$ pixels, and thus the aquatic creature range data set corresponding to the second image capturing time point includes one aquatic creature position data set (8,14). Further another example, the binarized pixel data set of the flow channel image corresponding to the third image capturing time point includes the black blocks located at the $7^{th}$-$19^{th}$ pixels and $13^{th}$-$15^{th}$ pixels, and thus the aquatic creature range data set corresponding to the third image capturing time point includes three aquatic creature position data sets (7,9) and (13,15).

Then, step 850 is performed to determine identification and direction information of aquatic creature corresponding to each of the aquatic creature range data sets in accordance with the aquatic creature range data sets. Referring to FIGS. 11a-11c, FIGS. 11a-11c are schematic diagrams showing the identification and direction information of aquatic creature in accordance with an embodiment of the present invention. As shown in FIG. 11a, because the first image capturing time point is an initial time point, and the aquatic creature range data set corresponding to the first image capturing time point includes two aquatic creature position data sets (7,9) and (13,15), two identification codes of aquatic creature (for example, fry) #1 and #2 are given to the two aquatic creature position data sets, and a direction code of aquatic creature N is given to represent an uncertain direction. Therefore, the identification and direction information of aquatic creature corresponding to the aquatic creature range data set of the first image capturing time point is <#1,(7,9),N>, <#2,(13, 15),N>, as shown in FIG. 11a.

As shown in FIG. 11b, the second image capturing time point follows the first image capturing time point, and the corresponding aquatic creature range data set includes one aquatic creature position data set (8,14), in which the aquatic creature position data set (8,14) overlaps the above <#1,(7, 9),N> and <#2,(13,15),N>. Because the aquatic creature position data set (8,14) overlaps both the above <#1,(7,9), N>, <#2,(13,15),N>, in this embodiment, the aquatic creature position data set (8,14) can succeed both the identification code of aquatic creature #1 and #2, and the direction code of aquatic creature R is given to represent that the aquatic creature #1 moves toward right side, and the direction code of aquatic creature L is given to represent that the aquatic creature #2 moves toward left side. Therefore, the identification and direction information of aquatic creature corresponding to the aquatic creature range data set of the second image capturing time point is <#1, (8,14), R>, <#2, (8,14), L>.

As shown in FIG. 11c, the third image capturing time point follows the second image capturing time point, and the corresponding aquatic creature range data set includes two aquatic creature position data sets (7,9) and (13,15), in which aquatic creature position data sets (7,9) and (13,15) overlaps the above <#1, (8,14),R>, <#2, (8,14),L>. In this embodiment, a time point before the second image capturing time point (the first image capturing time point) and a time point after the second image capturing time point (the third image capturing time point) correspond to the aquatic creature range data sets having plural overlapped ranges. Therefore, it is determined that the aquatic creatures overlaps each other at the second image capturing time point, and the identification and direction information of aquatic creature corresponding to the aquatic creature range data set of the third image capturing time point is set to be <#1, (13, 15), R>, <#2, (7, 9), L>.

Then, step 860 is performed to determine a number of aquatic creatures passing through the scan line in accordance with the identification and direction information of aquatic creature corresponding to each of the aquatic creature range data sets. As shown in FIG. 11c, it can be understood that the identification and direction information of aquatic creature to which all of the aquatic creature range data sets correspond includes two identification codes of aquatic creature #1-#2. In other words, there are two aquatic creatures passing though the scan line SC between the first image capturing time point and the fourth image capturing time point.

As state above, the method for counting aquatic creatures of this embodiment can be used to count fries when they move across each other, thereby avoiding that the fries counting is affected by the fries moving across each other.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method for counting aquatic creatures, comprising:
    providing a plurality of flow channel images of a flow channel, wherein the flow channel images correspond to a plurality of image capturing time points in a one-to-one manner;
    defining a scan line in each of the flow channel images, wherein the scan line corresponds to a plurality of scan line pixels in each of the flow channel images;
    performing a binarization process on the scan line pixels in each of the flow channel images to obtain a plurality of binarized pixel data sets, wherein the binarized pixel data sets correspond to the flow channel images in a one-to-one manner;
    determining a plurality of aquatic creature range data sets in accordance with the binarized pixel data sets, wherein the aquatic creature range data sets correspond to the flow channel images in a one-to-one manner, and each of the aquatic creature range data sets comprises at least one aquatic creature position data set, and the aquatic creature position data set includes a start position of aquatic creature and an end position of aquatic creature;
    determining identification and moving direction information of aquatic creature corresponding to each of the aquatic creature range data sets in accordance with the aquatic creature range data sets; and
    determining a number of aquatic creatures passing through the scan line in accordance with the identification and moving direction information of aquatic creature corresponding to each of the aquatic creature range data sets.

2. The method of claim 1, wherein determining the identification and moving direction information of aquatic creature corresponding to each of the aquatic creature range data sets in accordance with the aquatic creature range data sets comprises:

determining a first identification code of aquatic creature and a corresponding first direction code of aquatic creature in accordance with a first aquatic creature range data set, wherein the first aquatic creature range data set is one of the aquatic creature range data sets; and determining a second identification code of aquatic creature and a corresponding second direction code of aquatic creature in accordance with a second aquatic creature range data set, the first identification code of aquatic creature and the first direction code of aquatic creature, wherein the second aquatic creature range data set is one of the aquatic creature range data sets corresponding to a time point later than a time point to which the first aquatic creature range data corresponds.

3. The method of claim 2, wherein determining the second identification code of aquatic creature and the corresponding second direction code of aquatic creature in accordance with the second aquatic creature range data set, the first identification code of aquatic creature and the first direction code of aquatic creature comprises:

determining whether the aquatic creature position data set of the second aquatic creature range data set overlaps or adjoins the aquatic creature position data set of the first aquatic creature range data set;

when the aquatic creature position data set of the second aquatic creature range data set overlaps or adjoins the aquatic creature position data set of the first aquatic creature range data set, a value of the second identification code is set to be the same as the value of the first identification code.

4. The method of claim 2, wherein determining the identification and moving direction information of aquatic creature corresponding to each of the aquatic creature range data sets in accordance with the aquatic creature range data sets further comprises:

determining a third identification code of aquatic creature and a corresponding third direction code of aquatic creature in accordance with a third aquatic creature range data set, the second identification code of aquatic creature and the second direction code of aquatic creature, wherein the third aquatic creature range data set is one of the aquatic creature range data sets corresponding to a time point later than a time point to which the second aquatic creature range data corresponds;

wherein when the aquatic creature position data set of the third aquatic creature range data set overlaps or adjoins the aquatic creature position data set of the second aquatic creature range data set, a value of the third identification code is set to be the same as the value of the second identification code.

5. The method of claim 4, wherein determining the identification and moving direction information of aquatic creature corresponding to each of the aquatic creature range data sets in accordance with the aquatic creature range data sets further comprises:

performing a check step to determining whether the direction represented by the third direction code of aquatic creature is opposite to the direction represented by the second direction code of aquatic creature;

when the direction represented by the third direction code of aquatic creature is opposite to the direction represented by the second direction code of aquatic creature, the value of the third identification code is set to be a new value different from the value of the second identification code.

6. The method of claim 1, wherein determining the identification and moving direction information of aquatic creature corresponding to each of the aquatic creature range data sets in accordance with the aquatic creature range data sets comprises:

determining whether the aquatic creature position data sets of a first aquatic creature range data set overlaps the aquatic creature position data set of a second aquatic creature range data set to provide a first determination result, wherein the first aquatic creature range data set is one of the aquatic creature range data sets, the second aquatic creature range data set is another one of the aquatic creature range data sets corresponding to a time point later than a time point to which the first aquatic creature range data corresponds;

determining whether the aquatic creature position data sets of a third aquatic creature range data set overlaps the aquatic creature position data set of the second aquatic creature range data set to provide a second determination result, wherein the third aquatic creature range data set is further another one of the aquatic creature range data sets corresponding to a time point later than the time point to which the second aquatic creature range data corresponds; and when the first determination result and the second determination result are yes, it is determined that the aquatic creatures overlaps each other at the image capturing time point of the second aquatic creature range data set, and the identification and moving direction information of aquatic creature is determined accordingly.

7. A system for counting aquatic creatures, comprising:

an image capturing device configured to capture a plurality of flow channel images of a flow channel, wherein flow channel images correspond to a plurality of image capturing time points in a one-to-one manner; and a computer system, electrically connected to the image capturing device to receive the flow channel images, wherein the computer system comprises:

a memory configured to store a plurality of instructions; and a processor configured to execute the instructions to:

define a scan line in each of the flow channel images, wherein the scan line corresponds to a plurality of scan line pixels in each of the flow channel images;

perform a binarization process on the scan line pixels in each of the flow channel images to obtain a plurality of binarized pixel data sets, wherein the binarized pixel data sets correspond to the flow channel images in a one-to-one manner;

determine a plurality of aquatic creature range data sets in accordance with the binarized pixel data sets, wherein the aquatic creature range data sets correspond to the flow channel images in a one-to-one manner, and each of the aquatic creature range data sets comprises at least one aquatic creature position data set, and the aquatic creature position data set includes a start position of aquatic creature and an end position of aquatic creature;

determine identification and moving direction information of aquatic creature corresponding to each of the aquatic creature range data sets in accordance with the aquatic creature range data sets; and determine a number of aquatic creatures passing through the scan line in accordance with the identification and moving direction information of aquatic creature corresponding to each of the aquatic creature range data sets.

8. The system of claim 7, wherein when the processor determines the identification and moving direction information of aquatic creature corresponding to each of the aquatic creature range data sets in accordance with the aquatic creature range data sets, the processor is configured to:

determine a first identification code of aquatic creature and a corresponding first direction code of aquatic creature in accordance with a first aquatic creature range data set, wherein the first aquatic creature range data set is one of the aquatic creature range data sets; and determine a second identification code of aquatic creature and a corresponding second direction code of aquatic creature in accordance with a second aquatic creature range data set, the first identification code of aquatic creature and the first direction code of aquatic creature, wherein the second aquatic creature range data set is one of the aquatic creature range data sets corresponding to a time point later than a time point to which the first aquatic creature range data corresponds.

9. The system of claim 8, wherein when the processor determine the second identification code of aquatic creature and the corresponding second direction code of aquatic creature in accordance with the second aquatic creature range data set, the first identification code of aquatic creature and the first direction code of aquatic creature, the processor is configured to:

determine whether the aquatic creature position data set of the second aquatic creature range data set overlaps or adjoins the aquatic creature position data set of the first aquatic creature range data set;

when the aquatic creature position data set of the second aquatic creature range data set overlaps or adjoins the aquatic creature position data set of the first aquatic creature range data set, a value of the second identification code is set to be the same as the value of the first identification code.

10. The system of claim 9, wherein when the processor determines the identification and moving direction information of aquatic creature corresponding to each of the aquatic creature range data sets in accordance with the aquatic creature range data sets, the processor is configured to:

determine a third identification code of aquatic creature and a corresponding third direction code of aquatic creature in accordance with a third aquatic creature range data set, the second identification code of aquatic creature and the second direction code of aquatic creature, wherein the third aquatic creature range data set is one of the aquatic creature range data sets corresponding to a time point later than a time point to which the second aquatic creature range data corresponds;

wherein when the aquatic creature position data set of the third aquatic creature range data set overlaps or adjoins the aquatic creature position data set of the second aquatic creature range data set, a value of the third identification code is set to be the same as the value of the second identification code.

11. The system of claim 10, wherein when the processor determines the identification and moving direction information of aquatic creature corresponding to each of the aquatic creature range data sets in accordance with the aquatic creature range data sets, the processor is configured to:

perform a check step to determining whether the direction represented by the third direction code of aquatic creature is opposite to the direction represented by the second direction code of aquatic creature;

when the direction represented by the third direction code of aquatic creature is opposite to the direction represented by the second direction code of aquatic creature, the value of the third identification code is set to be a new value different from the value of the second identification code.

12. The system of claim 7, wherein when the processor determines the identification and moving direction information of aquatic creature corresponding to each of the aquatic creature range data sets in accordance with the aquatic creature range data sets, the processor is configured to:

determine whether the aquatic creature position data sets of a first aquatic creature range data set overlaps the aquatic creature position data set of a second aquatic creature range data set to provide a first determination result, wherein the first aquatic creature range data set is one of the aquatic creature range data sets, the second aquatic creature range data set is another one of the aquatic creature range data sets corresponding to a time point later than a time point to which the first aquatic creature range data corresponds;

determine whether the aquatic creature position data sets of a third aquatic creature range data set overlaps the aquatic creature position data set of the second aquatic creature range data set to provide a second determination result, wherein the third aquatic creature range data set is further another one of the aquatic creature range data sets corresponding to a time point later than the time point to which the second aquatic creature range data corresponds; and when the first determination result and the second determination result are yes, it is determined that the aquatic creatures overlaps each other at the image capturing time point of the second aquatic creature range data set, and the identification and moving direction information of aquatic creature is determined accordingly.

* * * * *